United States Patent
Matsubara et al.

(10) Patent No.: US 7,022,300 B2
(45) Date of Patent: Apr. 4, 2006

(54) PROCESS FOR PRODUCING INORGANIC SPHERES

(75) Inventors: Toshiya Matsubara, Chiba (JP); Masaharu Tanaka, Fukuoka (JP); Shin Tatematsu, Kanagawa (JP); Kazuhiko Yamada, Kanagawa (JP); Kenji Yamada, Kanagawa (JP); Kenichi Ebata, Fukuoka (JP); Hajime Katayama, Chiba (JP); Kentarou Tsunozaki, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 237 days.

(21) Appl. No.: 10/618,656

(22) Filed: Jul. 15, 2003

(65) Prior Publication Data

US 2004/0258601 A1    Dec. 23, 2004

(30) Foreign Application Priority Data

Jul. 15, 2002  (JP) .............................. 2002-205609
Mar. 14, 2003 (JP) .............................. 2003-069832
Mar. 31, 2003 (JP) .............................. 2003-095526

(51) Int. Cl.
*C01B 33/12* (2006.01)

(52) U.S. Cl. ................................... 423/338

(58) Field of Classification Search ............... None
See application file for complete search history.

(56) References Cited

U.S. PATENT DOCUMENTS

| | | | |
|---|---|---|---|
| 4,201,691 A | | 5/1980 | Asher et al. |
| 4,621,068 A | * | 11/1986 | Hansen ........................... 502/8 |
| 5,376,347 A | * | 12/1994 | Ipponmatsu et al. ........ 423/338 |
| 5,849,055 A | | 12/1998 | Arai et al. |
| 6,155,710 A | | 12/2000 | Nakajima et al. |
| 6,224,794 B1 | * | 5/2001 | Amsden et al. ............... 264/4.1 |
| 6,267,942 B1 | | 7/2001 | Mori et al. |
| 6,413,489 B1 | * | 7/2002 | Ying et al. ................... 423/600 |
| 6,451,862 B1 | * | 9/2002 | Kusaka et al. ............... 516/111 |
| 2002/0043731 A1 | * | 4/2002 | Nakajima et al. .............. 264/5 |

FOREIGN PATENT DOCUMENTS

| | | |
|---|---|---|
| JP | 57-55454 | 11/1982 |
| JP | 2-61407 | 12/1990 |
| JP | 2001-146415 | 5/2001 |

OTHER PUBLICATIONS

U.S. Appl. No. 10/618,656, filed Jul. 15, 2003, Matsubara et al.
U.S. Appl. No. 10/864,593, filed Jun. 10, 2004, Matsubara et al.

* cited by examiner

*Primary Examiner*—Colleen P. Cooke
(74) *Attorney, Agent, or Firm*—Oblon, Spivak, McClelland, Maier & Neustadt, P.C.

(57) ABSTRACT

A process for producing inorganic spheres, which comprises injecting an aqueous liquid containing an inorganic compound through an inlet hole into an organic liquid which flows at a flow rate of from 0.001 to 2 m/s in a laminar flow state in a flow path to form a W/O type emulsion, and solidifying the aqueous liquid containing an inorganic compound in the W/O type emulsion.

19 Claims, 3 Drawing Sheets

PROCESS FOR PRODUCING INORGANIC SPHERES

The present invention relates to a process for producing inorganic spheres. Particularly, it relates to a production process capable of producing inorganic spheres having a substantially uniform particle size useful for chromatography supports, cosmetic applications, catalyst supports, etc., by a stable continuous process with high productivity.

Heretofore, various methods have been known as methods to obtain inorganic spheres. JP-B-2-61407 discloses a method of forming a silica sol into spheres by a spray dryer, followed by drying. By this method, it is difficult to control the particle size distribution, and the shape of the spheres is likely to be irregular such that dents are formed on the particle surface. Further, in view of productivity, atomized droplets tend to attach to the inside of the chamber, whereby scale is likely to form, and continuous operation is likely to be impaired.

JP-B-57-55454 discloses a method to obtain inorganic spheres, by agitating an organic liquid with an inorganic compound aqueous solution in a tank reactor to prepare a W/O type emulsion, and precipitating inorganic particles in droplets of the inorganic compound aqueous solution in the emulsion. The inorganic spheres obtained by this method have a uniform particle size distribution as compared with ones obtained by the above spray dryer method, however, the particle size distribution of the inorganic spheres is still wide depending upon the particle size distribution of the emulsion. Further, since a batch operation is employed, there are problems in view of productivity.

U.S. Pat. No. 5,376,347 discloses a method of injecting an inorganic compound aqueous solution into an organic liquid through a polymer membrane having inlet holes which perforate in a thickness direction to prepare a W/O type emulsion, to obtain inorganic spheres from droplets of the inorganic compound aqueous solution in the emulsion. The particle size distribution of the emulsion can be narrowed by this method, however, this method is insufficient in view of uniformity in the particle size of the inorganic spheres, since the particle size is influenced by the physical properties of the polymer membrane and the flow of the organic liquid which is not controlled. Further, a syringe pump is employed as a method for supplying the inorganic compound aqueous solution, such being problematic in view of productivity.

In recent years, U.S. patent application 20020043731 proposes a method for manufacturing a homogeneous emulsion by injecting a pressurized inorganic compound aqueous solution through inlet holes with distortion into an organic liquid, and an apparatus therefor. In recent years, development of a method and an apparatus capable of producing inorganic spheres having a uniform particle size efficiently for a long term on a large scale stably has been desired.

Under these circumstances, it is an object of the present invention to provide a process for producing inorganic spheres having a substantially uniform particle size.

The present invention provides a process for producing inorganic spheres, which comprises injecting an aqueous liquid containing an inorganic compound through an inlet hole into an organic liquid which flows at a flow rate of from 0.001 to 2 m/s in a laminar flow state in a flow path to form a W/O type emulsion, and solidifying the aqueous liquid containing an inorganic compound in the W/O type emulsion.

The present invention further provides an apparatus for producing inorganic spheres, which is constituted in such a manner that an aqueous liquid containing an inorganic compound is injected into an organic liquid which flows at a flow rate of from 0.001 to 2 m/s in a laminar flow state in a flow path compartmentalized by a partition wall through at least 100 inlet holes which perforate in a thickness direction of the partition wall to form a W/O type emulsion, and the aqueous liquid containing an inorganic compound in the emulsion is solidified to form inorganic spheres.

Figure 1:
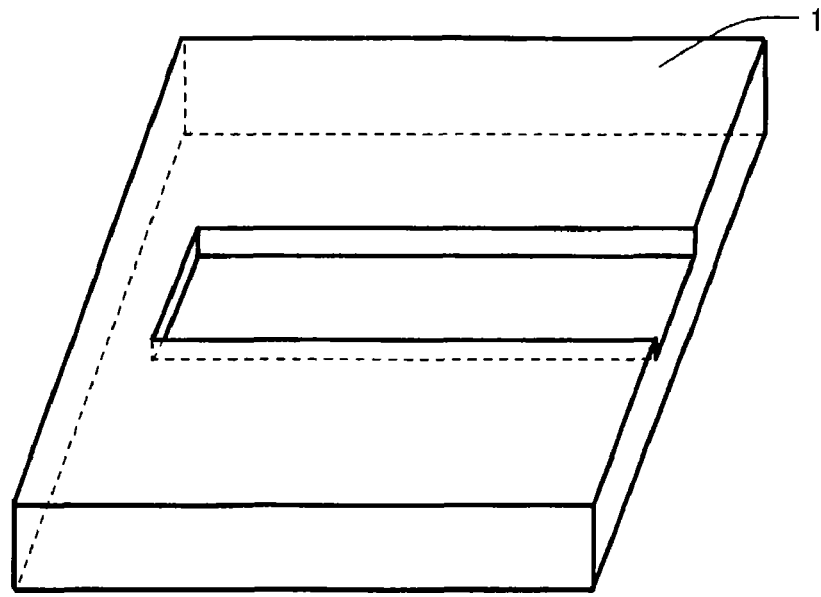
FIG. 1 is a diagram illustrating a component for an emulsification apparatus employed in Example 1.

In the present invention, an aqueous liquid containing an inorganic compound is injected through an inlet hole into an organic liquid which flows in a laminar flow to form an emulsion in which the organic liquid is present as a dispersoid (continuous phase) and droplets of the aqueous solution containing an inorganic compound are present as a dispersed phase in the continuous phase, i.e. a so-called W/O type emulsion, and then the droplets of the aqueous liquid containing an inorganic compound in the W/O type emulsion are solidified to form inorganic spheres.

As the aqueous liquid containing an inorganic compound, any liquid may be used so long as it can form a precipitate by solidification. Not only an aqueous solution of an inorganic compound but also a colloidal solution such as a silica sol or an alumina sol may be employed. As the aqueous solution of an inorganic compound, specifically, an aqueous solution of a metal salt or a metal complex may be mentioned. As the metal salt, a silicate or an aluminate of an alkali metal, a halide of an alkaline earth metal, a sulfate, a hydrochloride or a nitrate of copper, or a sulfate, a hydrochloride or a nitrate of cobalt or nickel may be mentioned.

In the present invention, it is preferred to employ an aqueous liquid containing silica as the aqueous liquid containing an inorganic compound. Specifically, an aqueous solution containing a water-soluble silica and an aqueous dispersion containing a solid silica such as a silica sol obtained by hydrolyzing an organic silicon compound or a commercially available silica sol, may be mentioned. Particularly, an aqueous solution of an alkali metal silicate is preferably employed. The alkali metal may, for example, be lithium, sodium, potassium or rubidium, and among them, sodium is most preferred from availability and economical reasons. The proportion of sodium to silicate is preferably from 2.0 to 3.8, more preferably from 2.0 to 3.5 by $Na_2O/SiO_2$ molar ratio. The concentration of the alkali metal silicate aqueous solution is preferably from 5 to 30 mass %, more preferably from 5 to 25 mass % as the $SiO_2$ concentration.

As the organic liquid, a $C_{9-12}$ saturated hydrocarbon is preferred, and the organic liquid is selected taking operation property, safety from flame, separation property between the solidified particles and the organic liquid, shape-holding properties of the inorganic spherical particles, solubility of the organic liquid in water, etc., into consideration totally. The $C_{9-12}$ saturated hydrocarbon may be used alone or as a mixture of at least two. The $C_{9-12}$ saturated hydrocarbon may be a linear hydrocarbon or a hydrocarbon having side chains so long as its chemical stability is good.

As the $C_{9-12}$ saturated hydrocarbon, preferred is one having a flash point of from 20 to 80° C. If a saturated hydrocarbon having a flash point of less than 20° C. is employed as the organic liquid, the flash point is too low, whereby countermeasures for fire prevention and work environment are required. Further, one having a flash point exceeding 80° C. has a low volatility, whereby the amount of the hydrocarbon adhered to the obtained inorganic spheres may increase.

In the present invention, the W/O type emulsion and the organic liquid are usually subjected to liquid-liquid separation, and the inorganic spheres and the organic liquid after solidifying the emulsion are usually subjected to solid-liquid separation. The organic liquid in the W/O type emulsion or attached to or adsorbed in the inorganic spheres after separation is preferably vaporized and separated by e.g. a drying operation. The organic liquid preferably has a boiling point of at most 200° C. from such a viewpoint that it is readily separated by vaporization, and as the organic liquid which satisfies such a condition, preferred is at least one member selected from the group consisting of $C_9H_{20}$, $C_{10}H_{22}$ and $C_{11}H_{24}$.

In the present invention, it is preferred to employ a surfactant for formation of the W/O type emulsion. As the surfactant, although an anionic surfactant or a cationic surfactant may be employed, a nonionic surfactant is preferred in view of easiness of adjustment of hydrophilicity and lipophilicity. For example, a polyethylene glycol fatty acid ester, a polyethylene glycol alkyl ether, a sorbitan fatty acid ester, a polyoxyethylene sorbitan fatty acid ester, a polyoxyethylene alkyl phenyl ether and a polyoxyethylene alkyl ether are preferred.

The amount of the surfactant varies depending upon conditions such as the type of the surfactant, HLB (hydrophile-lipophile balance) as an index of the degree of hydrophilicity or hydrophobicity of the surfactant and the aimed particle size of the inorganic spheres, however, it is preferably contained in an amount of from 500 to 20,000 ppm, preferably from 1,000 to 10,000 ppm, in the organic liquid. If it is less than 500 ppm, droplets of the aqueous solution to be emulsified tend to be large, whereby the emulsion may be unstable. Further, if it exceeds 20,000 ppm, the amount of the surfactant attached to the inorganic spherical particles as a product tends to be large, such being unfavorable.

In the present invention, by adjusting the flow rate of the organic liquid to from 0.001 to 2 m/s, emulsion droplets having a narrow particle size distribution are formed, whereby the particle size distribution of the obtained inorganic spheres can be narrowed. The flow rate of the organic liquid is more preferably from 0.01 to 1 m/s.

The Reynolds number of the organic liquid which flows in the flow path is at most 2,100. The Reynolds number in a case where the cross section of the flow path is circular is calculated from the formula 1, and as the inner diameter D of the flow path, the minimum diameter in the cross section of the flow path is employed. D is the inner diameter (m) of the flow path, u is the average flow rate (m/s), $\rho$ is the fluid density (kg/m$^3$), and $\mu$ is the fluid viscosity (Pa·s).

$$\text{Reynolds number } (-) = D \cdot u \cdot \rho / \mu \quad \text{Formula 1}$$

Further, the Reynolds number in a case where the cross section of the flow path is not circular is calculated from the Formula 2. r is the hydraulic radius (m) of the flow path={cross-sectional area (m$^2$) of the flow path}/{circumference (m) of the cross section of the flow path which is in contact with the liquid}, and u, $\rho$ and $\mu$ are as defined for the Formula 1.

$$\text{Reynolds number } (-) = 4 \times r \cdot u \cdot \rho / \mu \quad \text{Formula 2}$$

If the Reynolds number is at most 2,100, the flow of the organic liquid is in a laminar flow state, and thus the flow of the organic liquid is stable. As a result, the aqueous liquid containing an inorganic compound supplied through the inlet hole becomes a W/O type emulsion having an always constant particle size, whereby inorganic spheres having a substantially uniform particle size are likely to be produced. On the other hand, if the Reynolds number exceeds 2,100, the flow of the organic liquid is in a turbulent flow state, whereby a W/O type emulsion having irregular particle sizes similar to that of a conventional one tends to be obtained, and as a result, the particle sizes of the inorganic spheres are also irregular. The shape of the flow path of the organic liquid is not particularly limited.

In order to further stabilize the flow of the organic liquid, the Reynolds number of the flow of the organic liquid is preferably at most 500.

The aqueous liquid injected through the inlet hole grows to be larger than the hole size at the outlet of the inlet hole due to the interfacial force. Then, the droplets are cut off from one another by the flow of the organic liquid, and become droplets of the W/O type emulsion in the organic liquid.

Figure 2:
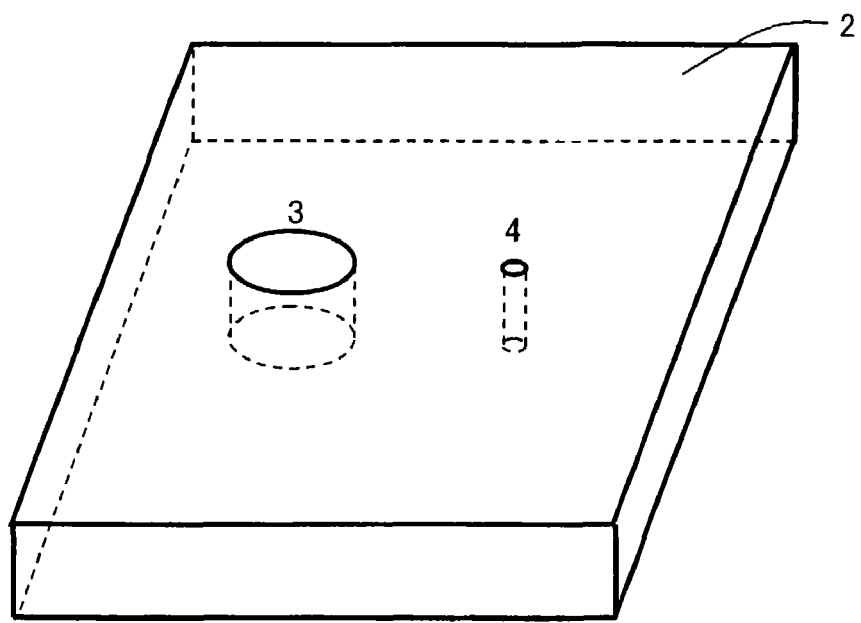
FIG. 2 is a diagram illustrating another component for an emulsification apparatus employed in Example 1.
Figure 3:
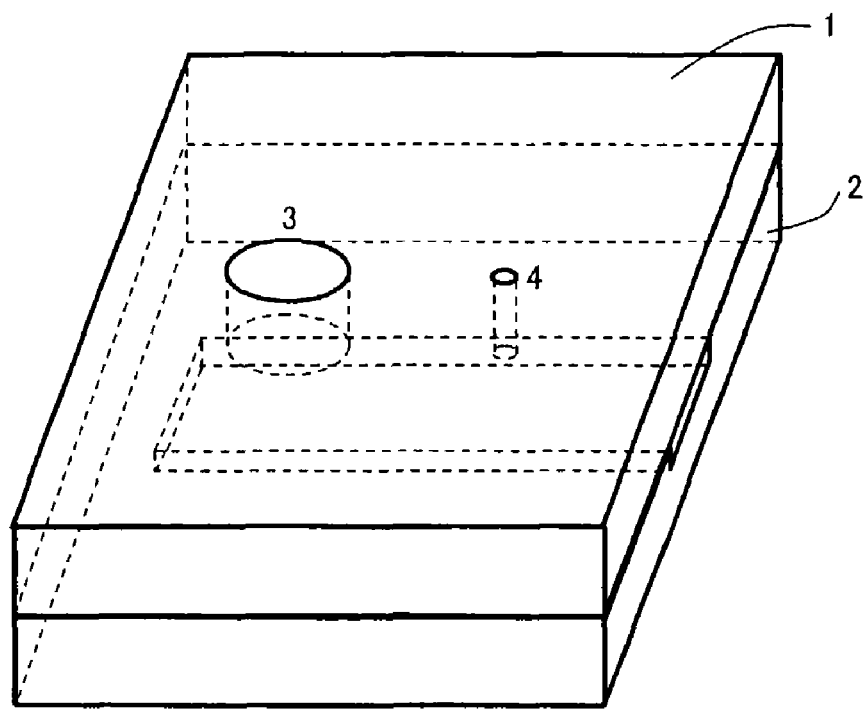
FIG. 3 is a diagram illustrating the main part of an emulsification apparatus employed in Example 1.
Figure 4:
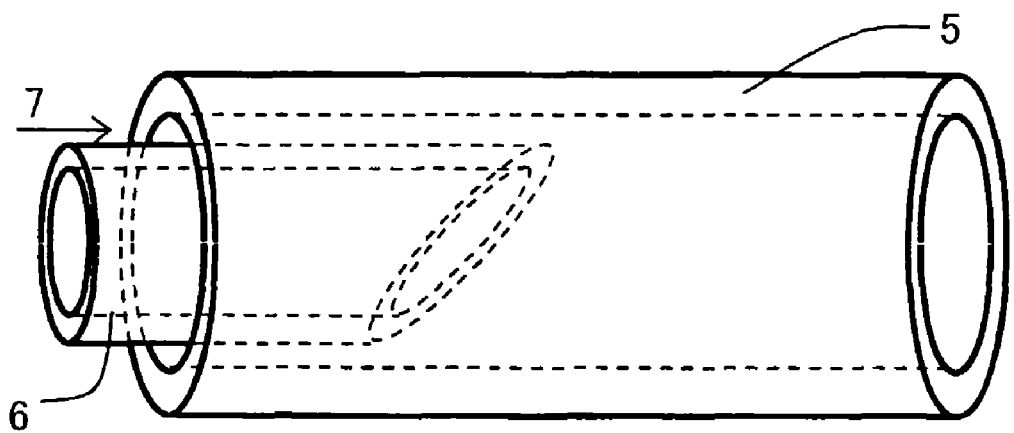
FIG. 4 is a diagram illustrating the main part of an emulsification apparatus employed in Example 2.
Figure 5:
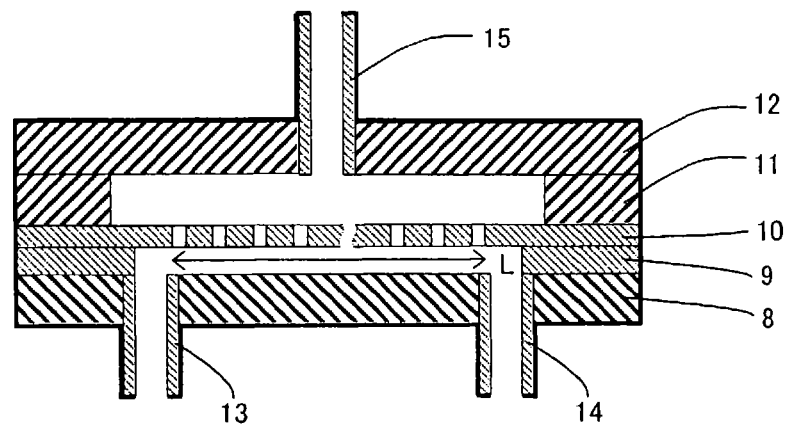
FIG. 5 is a cross-sectional view illustrating an emulsification apparatus employed in Examples 3 and 5 to 8.
Figure 6:
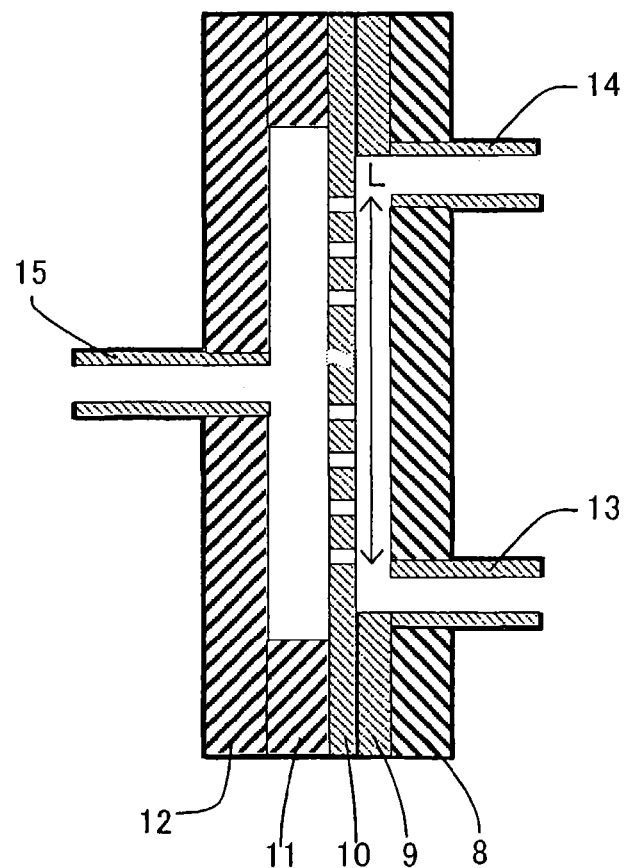
FIG. 6 is a cross-sectional view illustrating an emulsification apparatus employed in Example 4.

Now, the mode for carrying out the present invention will be explained with reference to drawings. In FIGS. 1 to 3, numerical references 1 and 2 designate an acryl resin plate. In FIG. 3, an aqueous liquid containing an inorganic compound is introduced through an inlet hole 4, and injected into an organic liquid which is introduced from an inlet hole 3 and flows in a laminar flow state. In FIG. 4, numerical reference 5 designates a tube made of polytetrafluoroethylene. In FIG. 4, the aqueous is liquid containing an inorganic compound is introduced from a needle 6 for syringe, and injected into an organic liquid which is introduced through a tube edge 7 and flows in a laminar flow state. In FIGS. 5 and 6, numerical references 8 and 12 designate an acryl resin plate, numerical reference 9 designates a fluororesin sheet, numerical reference 10 designates a stainless steel plate, and numerical reference 11 designates a component for an acryl resin plate. In FIGS. 5 and 6, an aqueous liquid containing an inorganic compound is introduced from a nozzle 15, and injected through inlet holes into an organic liquid which is introduced from a nozzle 13 and flows in a laminar flow state and is discharged from a nozzle 14.

In the present invention, the cross section of the inlet hole through which the aqueous liquid containing an inorganic compound is supplied preferably has at least one shape selected from the group consisting of circular, rectangular, triangular and elliptic shapes, whereby processing is relatively easy, and inorganic spheres having a uniform particle size can stably be produced. The quadruple of the hydraulic radius r of the cross section of the inlet hole is preferably from 0.1 to 500 μm. r is the hydraulic radius (m) of the cross section={cross-sectional area (m$^2$) of the inlet hole}/{circumference (m) of the cross section of the inlet hole which are in contact with the fluid}, as defined for the Formula 2. Here, it is essential that every hole is a hole smaller than the width of the flow path of the organic liquid. As the method for forming the inlet hole, a processing method employing a laser such as an excimer laser or pressing may be mentioned, but the method is not particularly limited.

It is estimated that when the cross section of the inlet hole has at least one shape selected from the group consisting of rectangular, triangular and elliptic shapes, the droplets have a curvature distribution when the aqueous liquid is formed into droplets at the outlet of the hole, they are spontaneously cut off from one another at a relatively early stage and become droplets in the organic liquid. Accordingly, the emulsion particle size is relatively small, such being favorable, as compared with a case where circular holes are employed. Further, at this time, the ratio of the diameter of a circle which is circumscribed around the cross-sectional shape to the diameter of a circle which is inscribed in the cross-sectional shape is preferably at most 20. It is more preferably at most 10. If it exceeds 20, the droplets tend to be divided in a long axis direction, and as a result, the emulsion particles tend to be non-uniform, such being unfavorable. It is particularly preferred that the diameter of a circle which is inscribed in the cross-sectional shape is at least 1 µm, and the diameter of a circle which is circumscribed around the cross-sectional shape is at most 80 µm.

The droplet size of the formed W/O type emulsion is influenced also by the ratio of the linear velocity of the organic liquid in a flow direction to the linear velocity of the aqueous liquid in a flow direction. In the present invention, the ratio of the linear velocity is preferably from 1 to 500, more preferably from 10 to 300. If the ratio of the linear velocity exceeds 500, the organic liquid may excessively be consumed, such being unfavorable from the economical viewpoint. Further, if it is less than 1, such an effect that the droplets are cut off from one another by the flow of the organic liquid is less likely to be obtained, whereby the emulsion particles may be non-uniform.

In the present invention, as shown in FIGS. 3, 5 and 6, it is preferred that the flow path of the organic liquid is compartmentalized by a partition wall, and the aqueous liquid is injected through the inlet hole which perforates in a thickness direction of the partition wall, whereby the aqueous liquid and the organic liquid are mixed in a cross flow, and inorganic spheres having a small particle size are likely to be stably obtained, as compared with a case where the aqueous liquid and the organic liquid are mixed in a parallel flow as shown in FIG. 4, because such an effect that the emulsion droplets are cut off from one another by the flow of the organic is liquid is likely to be obtained.

It is preferred that a plurality of the inlet holes are formed on the flow path of the organic liquid with a distance of at least half the diameter of a circle which is circumscribed around the cross-sectional shape of the inlet holes, more preferably with a distance of at least the diameter of a circle which is circumscribed around the cross-sectional shape of the inlet holes. If the inlet holes are formed only with a distance of shorter than half the diameter of a circle which is circumscribed, there is possibility that the droplets of the emulsion are united and as a result, the particle size becomes non-uniform. However, the inlet holes are formed preferably as close to one another as possible within a range where the droplets are not united, thus improving the productivity.

In a case where a plurality of the inlet holes are formed, the pressure loss in the flow path of the organic liquid may cause the difference in diameter of the droplets formed from inlet holes at the upstream side and droplets formed from inlet holes at the downstream side. Accordingly, the particle size of the obtained inorganic spheres tends to be non-uniform. For example, if the pressure loss in the flow path of the organic liquid is significant, the difference in pressure between the aqueous liquid and the organic liquid is relatively small at the inlet holes which are located at the upstream side of the flow of the organic liquid, whereby the amount of the aqueous liquid injected into the organic liquid is limited, and an emulsion with a small size is likely to form. On the other hand, the difference in pressure between the aqueous liquid and the organic liquid is relatively large at the inlet holes which are located at the downstream side, whereby the amount of the aqueous liquid injected tends to increase, and emulsion particles having sizes outside the aimed size are likely to form. As a result, inorganic spheres having a wide particle size distribution are likely to be obtained.

In the present invention, in FIGS. 5 and 6, it is preferred that at least 100 inlet holes are formed on a stainless steel plate 10, and the pressure loss of the organic liquid as between the inlet hole which is located at the most upstream side of the flow of the organic liquid and the inlet hole which is located at the most downstream side is from 10 to 1,000 Pa, whereby the amount of the aqueous liquid injected through the inlet holes is stabilized, and inorganic spheres having a uniform particle size are likely to be obtained. Particularly, inorganic spheres having a particle size highly uniformalized such that the number average particle size as measured from a scanning electron microphotograph is from 0.1 to 100 µm, and the value obtained by dividing the standard deviation of the particle size distribution by the number average particle size is at most 0.20, are likely to be obtained. From the viewpoint of the uniformalization of the particle size, the pressure loss is preferably at most 800 Pa, more preferably at most 500 Pa. If the pressure loss is less than 10 Pa, as the flow rate of the organic liquid is low, such an effect that the emulsion droplets are cut off from one another by the flow of the organic liquid is less likely to be obtained, whereby large particles having sizes outside the aimed size are likely to form.

The pressure loss (Pa) of the organic liquid in the organic liquid flow path may be calculated by employing a pressure loss formula in a laminar flow as described in Handbook on Chemical Engineering (Kagaku Kogaku Binran), 5th Edition for example. In a case where the cross-sectional shape is circular, it is calculated from the formula 3. L is the length (m) of the flow path, and D, u and µ are as defined for the formula 1.

$$\text{Pressure loss} = 32 \, \mu L u / D^2 \quad \text{Formula 3}$$

Further, if the cross-sectional shape of the flow path is rectangular, it is calculated from the formula 4. Here, $X = 16/3 - 1024/\pi^5 \times (b/a) \times \{\tanh(\pi a/2b) + 1/243 \times \tanh(3\pi a/2b) + \ldots \}$, a is the length (m) of the long side of the cross section of the flow path, b is the length (m) of the short side, and L, u and µ are as defined for the formula 3.

$$\text{Pressure loss} = 32 \, \mu L u / (b^2 X/2) \quad \text{Formula 4}$$

In the present invention, as shown in FIGS. 5 and 6, the distance between the inlet hole which is located at the most upstream side of the flow of the organic liquid and the inlet hole at the most downstream side is represented by L. L is preferably from 1 to 300 mm. If it is less than 1 mm, processing tends to be complicated, and no adequate productivity will be obtained. On the other hand, if it exceeds 300 mm, it is required to lower the flow rate of the organic liquid so as to maintain a pressure loss of from 10 to 1,000 Pa, whereby such an effect that the emulsion droplets are cut off from one another by the flow of the organic liquid is less likely to be obtained, and emulsion particles having sizes outside the aimed size are likely to form.

The apparatus for producing inorganic spheres of the present invention may be installed so that the flow path of the organic liquid is in parallel with the horizontal plane as shown in FIG. 5. In the case that the density of the organic liquid is smaller than the density of the aqueous liquid, the apparatus is preferably installed so that the flow path of the organic liquid has an angle of at least 30° to the horizontal plane and the organic liquid flows from bottom to top, whereby inorganic spheres having a uniform particle size are likely to be obtained. It is more preferable if the apparatus is installed so that the flow path of the organic liquid is vertical to the horizontal plane as in FIG. 6. In the case that the density of the organic liquid is larger is than the density of the aqueous liquid, it is preferable that the organic liquid flows from top to bottom with using the same apparatus described above.

In a case where the apparatus is installed so that the flow path of the organic liquid has an angle of at least 30° to the horizontal plane, a pressure due to the liquid depth is applied to each of the aqueous liquid side and the organic liquid side at a certain horizontal plane in a height-direction. Assuming that the liquid depths of the aqueous liquid and the organic liquid are substantially the same at the certain horizontal plane, the difference in pressure corresponding to {(density of the aqueous liquid)−(density of the organic liquid)}× (liquid depth) arises due to the difference in density between the aqueous liquid and the organic liquid. Accordingly, the distribution of the difference in pressure between the aqueous liquid side and the organic liquid side in the entire flow path can be made to be relatively narrow, by flowing the organic liquid from bottom to top in the case that the density of the organic liquid is smaller than the density of the aqueous liquid, or from top to bottom in the case that the density of the organic liquid is larger than that of the aqueous liquid, as compared with a case where the flow path of the organic liquid is in parallel with the horizontal plane as shown in FIG. 5. As a result, the amount of the aqueous liquid supplied from the inlet hole can be stabilized, and the emulsion droplet size can be uniformalized, such being effective for uniformalization of the particle size of the obtained inorganic spheres.

In the present invention, it is preferred that the quadruple of the hydraulic radius r of the cross section of the inlet hole is from 0.1 to 100 μm, the ratio of the number average particle size of the inorganic spheres to the quadruple of the hydraulic radius r of the cross section is from 0.1 to 5.0, and the ratio of the linear velocity of the organic liquid to the linear velocity of the aqueous liquid in a flow direction is from 10 to 300, whereby formation of fine particles having sizes significantly outside the aimed particle size as by-products can be prevented. The quadruple of the hydraulic radius r of the cross section of the inlet hole is preferably from 1 to 80 μm. In a case where the shape of the cross section of the inlet hole is circular, hydraulic radius r=(inner diameter D of the circle)/4, and thus the quadruple of the hydraulic radius r corresponds to the inner diameter D of the circle. If the quadruple of the hydraulic radius r of the cross section of the inlet hole is less than 0.1 μm, the amount of the aqueous liquid containing an inorganic compound supplied tends to be small, such being unfavorable in view of productivity. Further, if it is larger than 100 μm, emulsion particles having sizes outside the aimed particle size are likely to form.

Further, from the viewpoint to effectively obtain inorganic spheres having an aimed particle size, the ratio of the average particle size of the inorganic spheres to the above defined preferred range of the quadruple of the hydraulic radius r is preferably from 0.1 to 5.0, more preferably from 0.3 to 3.0. If the ratio is less than 0.1, productivity tends to decrease, and the possibility that the average particle size of the obtained inorganic spheres is larger than the aimed value tends to be high. On the other hand, if it exceeds 5.0, the particle size is less likely to be controlled, and the possibility that fine particles having sizes significantly outside the aimed particle size are formed as by-products tends to be high.

Formation of small particles having sizes significantly outside the aimed particle size as by-products can be prevented by adjusting the ratio of the linear velocity of the organic liquid to the linear velocity of the aqueous liquid in a flow direction to from 10 to 300, in addition to the above defined preferred range of the quadruple of the hydraulic radius r and preferred range of the ratio of the average particle size of the inorganic spheres to the quadruple of the hydraulic radius r. The ratio of the linear velocity is more preferably from 50 to 200. It is particularly advantageous to prepare inorganic spheres having a highly uniformalized particle size such that the number average particle size as measured by a scanning electron microphotograph is from 10 to 100 μm, and the value obtained by dividing the standard deviation of the particle size distribution by the number average particle size is at most 0.20.

In FIGS. 5 and 6, it is preferred that at least 100, more preferably at least 1,000 inlet holes are formed on a stainless steel plate 10 in order to improve productivity of the emulsion. In a case where a plurality of the inlet holes are formed on the stainless steel plate 10, the aqueous liquid is injected into the organic liquid through the inlet holes under a substantially constant pressure, and thus the linear velocity of the aqueous liquid in a flow direction can be measured at the inlet hole part.

In the present invention, as the material constituting the partition wall, one resistant to the aqueous liquid containing an inorganic compound and the organic liquid is employed. One composed mainly of a metal is preferred in view of excellent processability and strength, and one composed mainly of a resin may also be used preferably. As the resin, it is preferred to employ at least one member selected from polyphenylene sulfide, polyether ether ketone, polyimide, polyamideimide, aromatic polyester and a fluororesin in view of excellent processability and dimension stability.

The material constituting the partition wall on which the inlet hole which perforates in a thickness direction are formed, preferably has organophilic liquid properties. In a case of a metal material, it is preferred to apply a treatment to impart organophilic liquid properties to the material e.g. by a method of staining by oil. This is to accelerate separation of the aqueous liquid containing an inorganic compound from the partition wall after it passes through the inlet hole. It becomes clear by observation with a high speed camera that in a case where the partition wall is hydrophilic, the aqueous liquid flows along the partition wall after it passes through the inlet hole, whereby the particle size of the emulsion tends to be non-uniform.

As a method to solidify the aqueous liquid containing an inorganic compound in the W/O type emulsion to form inorganic spheres, a method of adding a precipitant to precipitate the inorganic compound may be employed. The precipitant may be an aqueous solution of at least one member selected from the group consisting of a halide or a carbonate of an alkali metal, an inorganic acid, an organic acid, an ammonium salt of an inorganic acid, an ammonium salt of an organic acid and a halide of an alkaline earth metal.

Specifically, an aqueous solution of e.g. ammonium hydrogen carbonate, ammonium sulfate, potassium chloride or potassium hydrogen carbonate may be mentioned, but it is not limited thereto.

In a case where the inorganic compound in the aqueous liquid containing an inorganic compound is silica, the W/O type emulsion is gelated, whereby the dispersion droplets of the aqueous solution in a form of spheres are gelated while keeping their shape, and spherical silica hydrogel is obtained. For gelation, it is preferred to introduce an gelling agent to the emulsion. As the gelling agent, an acid such as an inorganic acid or an organic acid is employed, and particularly an inorganic acid e.g. sulfuric acid, hydrochloric acid, nitric acid or carbon dioxide is preferred. It is most simple and preferred to employ carbon dioxide gas from the viewpoint of e.g. readiness of operation. As the carbon dioxide gas, pure carbon dioxide gas having a concentration of 100% may be introduced, or carbon dioxide gas diluted with air or an inert gas may be introduced. The time required for gelation is usually preferably from 4 to 30 minutes, and the temperature at the time of gelation is preferably from 5 to 30° C.

After completion of the gelation, it is preferred to leave the reaction system to stand so that the emulsion is separated into two phases of the organic liquid phase and the aqueous phase containing a silica hydrogel to separate the silica gel. In a case where a saturated hydrocarbon is employed as the organic liquid, the organic liquid phase as the upper layer and the aqueous is liquid phase containing the silica hydrogel as the lower layer are separated, and they are separated by a known means.

An acid such as sulfuric acid is added as the case requires to the aqueous slurry of the silica hydrogel to adjust pH to be from about 1 to about 5 to complete gelation, and the aqueous slurry is subjected to steam distillation at a temperature of from 60 to 150° C., preferably from 80 to 120° C. to distill off and remove a slight amount of the organic liquid remaining in the aqueous slurry, and heated at an appropriate pH of from about 7 to about 9 to carry out aging of the silica hydrogel.

After the above aging treatment is carried out, the aqueous slurry is subjected to filtration to obtain a silica hydrogel, which is dried at a temperature of from about 100 to about 150° C. for from about 1 to about 30 hours to obtain silica porous spherical particles.

In a case where an alkali silicate aqueous solution is employed as the aqueous liquid containing silica, and an acid is employed as the gelling agent, an alkali metal salt (e.g. sodium carbonate when the gelling agent is carbon dioxide for example) forms as a by-product, and in order to prevent inclusion of the salt in the silica porous spheres, it is preferred to adequately wash the silica hydrogel (wet cake) after filtration with water. As the case requires, water may be added to the wet cake after washing with water again to obtain a slurry, and filtration and washing with water are repeated again. At this time, an operation of adjusting the pH of the slurry to be from about 1 to about 5 and aging the silica hydrogel again may be carried out as the case requires.

Now, the present invention will be explained in further detail with reference to Examples. However, it should be understood that the present invention is by no means restricted to such specific Examples.

EXAMPLE 1

(1) Preparation of Solution

A sodium silicate aqueous solution having a $SiO_2$ concentration of 24.4 mass % and a $Na_2O$ concentration of 8.14 mass % ($SiO_2/Na_2O$ molar ratio=3.09, density: 1,320 kg/m$^3$) was prepared. As the organic liquid, n-decane ($C_{10}H_{22}$, density: 730 kg/m$^3$) was employed, and sorbitan monooleate as a surfactant was preliminarily dissolved in an amount of 5,000 ppm in n-decane.

(2) Preparation of Emulsification Apparatus

An emulsification apparatus is shown in FIG. 3. On an acryl resin plate 1 having a thickness of 2 mm in a 50 mm square, a groove having a length of 40 mm, a width of 500 μm and a depth of 100 μm was formed as shown in FIG. 1. On another acryl resin plate 2 having a thickness of 2 mm in a 50 mm square, a circular inlet hole 3 having an inner diameter of 500 μm and a circular inlet hole 4 having an inner diameter=4r=100 μm were formed as shown in FIG. 2, and a needle for syringe was inserted into each of the inlet holes and fixed by means of an epoxy type adhesive. The acryl resin plate 1 and the acryl resin plate 2 were overlayed one on the other as shown in FIG. 3, and four sides were clamped and fixed with an equal force. The two plates were fixed so that the inlet hole 3 and inlet hole 4 formed on the acryl resin plate 2 were on the groove formed on the acryl resin plate 1. Further, water was preliminarily supplied to the prepared apparatus to confirm that no liquid would leak.

(3) Emulsification

The emulsification apparatus prepared in (2) was put horizontally, and n-decane prepared in (1) and the sodium silicate aqueous solution prepared in (1) were supplied from the inlet hole 3 and the inlet hole 4, respectively, to continuously produce a W/O type emulsion having the sodium silicate aqueous solution dispersed in n-decane having the surfactant dissolved therein. The supply amount of n-decane was 7.2 mL/h, and the linear velocity in the flow path in a flow direction was $4.0 \times 10^{-3}$ m/s. The experiment was carried out at room temperature, and the Reynolds number of the flow of n-decane was about 6 as calculated from a hydraulic radius of the flow path of 41.7 μm and a viscosity of $8.0 \times 10^{-4}$ Pa·s, and n-decane flowed in a laminar flow state.

Further, the supply amount of the sodium silicate aqueous solution was 0.06 mL/h, and the linear velocity in a flow direction at the inlet hole part was $2.1 \times 10^{-4}$ m/s. Further, the ratio of the linear velocity of n-decane in a flow direction to the linear velocity of the sodium silicate aqueous solution in a flow direction at the inlet hole part was 19. The emulsion particles had a substantially uniform particle size of about 130 μm as confirmed by optical microscope observation.

(4) Gelation n-decane having the surfactant dissolved therein prepared in (1) was put in a 50 mL measuring cylinder, and carbon dioxide gas was blown to the solution in a supply rate of 100 mL/min. The W/O type emulsion prepared in (3) was continuously supplied to the measuring cylinder to carry out gelation. The formed silica hydrogel was separated from n-decane by two-phase separation employing the difference in specific gravity to obtain an aqueous slurry of the silica hydrogel. Then, 0.1 N sulfuric acid aqueous solution was added to the aqueous slurry of the silica hydrogel to adjust pH to 9 at 25° C., followed by aging at 80° C. for 1 hour. Then, the aqueous slurry was stood to cool to room temperature, 20 mass % of the sulfuric acid aqueous solution was further added thereto to adjust pH to 2, and the aqueous slurry was left to stand for 3 hours. Then, the aqueous slurry was subjected to filtration, washing and drying at 120° C. for 20 hours to obtain silica porous spheres.

(5) Confirmation of Shape

It was confirmed by a scanning electron microphotograph that the obtained-silica porous spheres were substantially spherical. Further, the particle size distribution was measured from the photographs. The average diameter was determined by the following process. Several photographs were taken so that a sum of more than 1,000 particles were included in the photographs. Then diameters of all the particles in the photographs were measured, and an arithmetical average value of the diameters was obtained. The number average particle size was 115 µm, and the standard deviation was 6 µm. At this time, the value obtained by dividing the standard deviation of the particle size distribution by the number average particle size was 0.052, and the silica porous spheres had a substantially uniform particle size. Here, (number average particle size)/4r=1.15.

EXAMPLE 2

A needle 6 for syringe having an inner diameter of 200 µm and an outer diameter of 410 µm were inserted into a tube 5 made of polytetrafluoroethylene having an inner diameter of 500 µm as shown in FIG. 4, and they were fixed so that liquids could be supplied by syringe pump from a tube edge 7 and the needle 6 for syringe. Water was preliminarily supplied to the prepared apparatus to confirm that no liquid would leak.

The prepared emulsification apparatus was put horizontally, and n-decane prepared in Example 1 and the sodium silicate aqueous solution prepared in Example 1 were supplied from the tube edge 7 and the needle 6 for syringe, respectively, to continuously prepare a W/O type emulsion. The supply amount of n-decane was 20 mL/h, and the linear velocity in the flow path in a flow direction was $8.6 \times 10^{-3}$ m/s. The experiment was carried out at room temperature, the Reynolds number of the flow of n-decane was about 7 as calculated from the hydraulic radius of the flow path of 22.5 µm, and the flow of n-decane was in a laminar flow state.

Further, the supply amount of the sodium silicate aqueous solution was 0.3 mL/h, and the linear velocity in a flow direction at the inside of the needle 6 for syringe was $2.7 \times 10^{-4}$ m/s. Further, the ratio of the linear velocity of n-decane in a flow direction to the linear velocity of the sodium silicate aqueous solution in a flow direction at the inlet hole part was 32. The emulsion particles had a substantially uniform particle size of about 270 µm, as confirmed by optical microscope observation.

The obtained emulsion particles were subjected to gelation in the same manner as in Example 1 to prepare silica porous spheres. It was confirmed by a scanning electron microphotograph that the obtained silica porous spheres were substantially spherical. Further, the particle size distribution was measured in the same manner as in Example 1 from the scanning electron microphotographs. The number average particle size was 227 µm, and the standard deviation was 14 µm. The value obtained by dividing the standard deviation of the particle size distribution by the number average particle size was 0.062, and the silica porous spheres had a substantially uniform particle size. Here, (number average particle size)/4r=1.14.

EXAMPLE 3

(1) Preparation of Liquids

The same sodium silicate aqueous solution as in Example 1 was prepared. As the organic liquid, isononane ($C_9H_{20}$, density: 730 kg/m$^3$) was employed, and sorbitan monooleate as a surfactant was preliminarily dissolved in an amount of 5,000 ppm in isononane.

(2) Preparation of Emulsification Apparatus

A cross-sectional view of an emulsification apparatus is shown in FIG. 5. On an acryl resin plate 8 having a thickness of 2 mm in a 50 mm square, two inlet holes having an inner diameter of 3.2 mm were formed, and a rubber tube piping (manufactured by SAINT-GOBAIN K. K., trade name: TYGON R-3603) having an outer diameter of 3.2 mm was connected to each of the inlet holes to obtain nozzles 13 and 14 so that a liquid could be supplied through the nozzle 13 and the liquid could be discharged through the nozzle 14. On the center part of another acryl resin plate 12 having a thickness of 2 mm in a 50 mm square, a inlet hole having an inner diameter of 3 mm was formed, and a tetrafluoroethylene tube having an inner diameter of 1 mm was connected by means of a joint component to obtain a nozzle 15, so that a liquid could be supplied through the nozzle 15. Further, of another acryl resin plate having a thickness of 2 mm in a 50 mm square, the inside 30 mm square was bored with a part with a distance of 10 mm from the periphery left, to prepare an acryl resin plate component 11. Then, on the center part of a stainless steel plate 10 having a thickness of 50 µm in a 50 mm square, ten inlet holes having an inner diameter=4r=30 µm and having a circular cross-sectional shape in a width direction with a pitch of 140 µm, and a hundred inlet holes in a length direction with a pitch of 250 µm, totally a thousand inlet holes were formed by means of an excimer laser. Further, a slit having a width of 3 mm and a length of 35 mm was formed on the center part of a fluororesin sheet having a thickness of 400 µm in a 50 mm square to prepare a fluororesin sheet 9.

The acryl resin plate 8, the fluororesin sheet 9, the stainless steel plate 10, the acryl resin plate component 11 and the acryl resin plate 12 were laminated in this order and the four sides were clamped and fixed with an equal force. Here, they were fixed so that the width direction and the length direction of the inlet holes formed on the stainless steel 10 fitted the width and the length directions of the slit prepared on the fluororesin sheet 9, respectively, the inlet holes were located at the center part of the slit, and the nozzle 13 and the nozzle 14 of the acryl resin plate 8 were located on the slit of the fluororesin sheet 9. Further, water was preliminarily supplied to the prepared apparatus to confirm that no liquid would leak.

(3) Emulsification

The emulsification apparatus prepared in (2) was put horizontally, and isononane having the surfactant dissolved therein prepared in (1) and the sodium silicate aqueous solution prepared in (1) were supplied through the nozzle 13 and the nozzle 15, respectively, to continuously prepare a W/O type emulsion having the sodium silicate aqueous solution dispersed in isononane having the surfactant dissolved therein. The supply amount of isononane having the surfactant dissolved therein was 1,350 mL/h. The production was carried out at room temperature.

The Reynolds number of the flow of isononane was about 215 as calculated from a hydraulic radius of the flow path of 176.5 µm, a linear velocity of isononane of 0.31 m/s and a viscosity of isononane of 7.5×10⁻⁴ Pa·s, and the flow of isononane was in a laminar flow state. The distance between the inlet hole which was located at the most upstream side of the organic liquid and the inlet hole which was located at the most downstream side, i.e. the length L of the flow path, was 0.025 m, and as the isononane flow path was rectangular, the pressure loss at L was calculated from the formula 4, whereupon it was 480 Pa. Further, the supply amount of the sodium silicate aqueous solution was 5.0 mL/h and the linear velocity in a flow direction at the inlet holes was $2.0 \times 10^{-3}$ m/s.

The ratio of the linear velocity of isononane in a flow direction to the linear velocity of the sodium silicate aqueous solution at the inlet holes in a flow direction was 159. The state of emulsification was confirmed by means of a high speed camera, whereupon the sodium silicate aqueous solution was formed into droplets at the inlet holes, and the emulsion particles had a substantially uniform particle size of about 60 µm.

(4) Gelation

Isononane having the surfactant dissolved therein prepared in (1) was put in a vessel having a capacity of about 5 L (diameter: 100 mm, height: 650 mm), and carbon dioxide gas was blown into the solution at a supply rate of 100 mL/min. The W/O type emulsion prepared in (3) was continuously supplied to the vessel to carry out gelation. The formed silica hydrogel was separated from isononane by means of two phase separation employing a difference in specific gravity to obtain an aqueous slurry of the silica hydrogel. Then, 0.1 N sulfuric acid aqueous solution was added to the obtained aqueous slurry of the silica hydrogel to adjust pH to 9 at 25° C., followed by aging at 80° C. for 1 hour. Then, the aqueous slurry was stood to cool to room temperature, 20 mass % of a sulfuric acid aqueous solution was further added to adjust pH to 2, and the aqueous slurry was left to stand for 3 hours. Then, the aqueous slurry was subjected to filtration, washing with water and drying at 120° C. for 20 hours to obtain silica porous spheres.

(5) Confirmation of Shape

It was confirmed by a scanning electron microphotograph that the obtained silica porous spheres were substantially spherical. Further, the particle size distribution was determined in the same manner as in Example 1 from the scanning electron microphotographs. The number average particle size was 51 µm, and the standard deviation was 6.8 µm. The value obtained by dividing the standard deviation of the particle size distribution by the number average particle size was 0.133, and the silica porous spheres had a substantially uniform particle size. Here, (number average particle size)/4r=1.70.

EXAMPLE 4

Silica porous spheres were obtained in the same manner as in Example 3 except that the emulsification apparatus was put vertically to the horizontal plane as shown in FIG. 6. In a length L, there was a difference in pressure of 659 Pa in total due to the difference in pressure of 179 Pa resulting from the liquid depth of isononane in addition to the pressure loss resulting from the flow as calculated in Example 3.

It was confirmed by a scanning electron microphotograph that the obtained silica porous spheres were substantially spherical, and the number average particle size was 50 µm, and the standard deviation was 4.9 µm. The value obtained by dividing the standard deviation of the particle size distribution by the number average particle size was 0.098, and the silica porous spheres had a substantially uniform particle size. Here, (the number average particle size)/4r=1.67.

EXAMPLE 5

Silica porous spheres were obtained in the same manner as in Example 3 except that a fluororesin sheet having a thickness of 200 µm in a 50 mm square and having a slit having a width of 2 mm and a length of 35 mm formed thereon was employed as the fluororesin sheet 9 in FIG. 5. As the isononane flow path was rectangular, the pressure loss in a length L was calculated from the formula 4 and it was 5,628 Pa, and the ratio of the linear velocity of isononane in a flow direction to the linear velocity of the sodium silicate aqueous solution at the inlet holes in a flow direction at the inlet hole part was 477.

The state of emulsification was confirmed by means of a high speed camera, whereupon although the sodium silicate aqueous solution supplied from the nozzle 15 was formed into droplets at the inlet holes, the droplet size of the emulsion tended to be large from the upstream to the downstream of the organic liquid flow path, and the distribution was wide.

It was confirmed by a scanning electron microphotograph that silica porous spheres obtained by gelating the obtained emulsion in the same manner as in Example 1 were substantially spherical, and the number average particle size was 55 µm and the standard deviation was 16.8 µm. The value obtained by dividing the standard deviation of the particle size distribution by the number average particle size was 0.305, and the distribution was wide as compared with Examples 3 and 4. Here, (number average particle size)/4r=1.83.

EXAMPLE 6

Silica porous spheres were obtained in the same manner as in Example 3 except that ten circular inlet holes having an inner diameter=4r=30 µm in a width direction with a pitch of 140 µm and a hundred inlet holes in a length direction with a pitch of 140 µm, totally a thousand inlet holes were formed by means of an excimer laser at the center part of the stainless steel plate 10 having a thickness of 50 µm in a 50 mm square in FIG. 5. As the isononane flow path was rectangular, the pressure loss in a length L (=0.014 m) was calculated from the formula 4, whereupon it was 269 Pa.

The ratio of the linear velocity of isononane in a flow direction to the linear velocity of the sodium silicate aqueous solution supplied from the inlet holes in a flow direction was 159. The state of emulsification was confirmed by means of a high speed camera, whereupon the sodium silicate aqueous solution was formed into droplets at the outlet of the inlet holes, and the emulsion particles had a substantially uniform particle size of about 60 µm.

It was confirmed by a scanning electron microphotograph that the obtained silica porous spheres were substantially spherical, and the number average particle size was 49 µm, and the standard deviation was 5.3 µm. The value obtained by dividing the standard deviation of the particle size distribution by the number average particle size was 0.108, and the silica porous spheres had a substantially uniform particle size. Here, (number average particle size)/4r=1.63.

EXAMPLE 7

A W/O type emulsion was continuously prepared in the same manner as in Example 3 except that ten elliptic inlet holes (4R=38.9 μm) having a long axis size of 60 μm and a short axis size of 30 μm in a width direction with a pitch of 140 μm and a hundred inlet holes in a length direction with a pitch of 200 μm, totally a thousand inlet holes were formed by means of an excimer laser at the center part of the stainless steel plate 10 having a thickness of 50 μm in a 50 mm square in FIG. 5. The supply amount of the sodium silicate aqueous solution was 10 mL/h, and the linear velocity of the aqueous solution in a flow direction at the inlet holes was $2.0\times10^{-3}$ m/s. As the isononane flow path was rectangular, the pressure loss in a length L (=0.020 m) was calculated from the formula 4, whereupon it was 384 Pa.

The ratio of the linear velocity of isononane in a flow direction to the linear velocity of the sodium silicate aqueous solution supplied from the inlet holes in a flow direction was 159. The state of emulsification was confirmed by means of a high speed camera, whereupon the sodium silicate aqueous solution was formed into droplets at the inlet holes, and the emulsion particles had a substantially uniform particle size of about 75 μm.

The obtained W/O type emulsion was gelated in the same manner as in Example 3 to obtain silica porous spheres. It was confirmed by a scanning electron microphotograph that the silica porous spheres were substantially spherical, and the number average particle size was 60 μm and the standard deviation was 7.2 μm. The value obtained by dividing the standard deviation of the particle size distribution by the number average particle size was 0.120, and the silica porous spheres had a substantially uniform particle size. Here, (number average particle size)/4r=1.54.

EXAMPLE 8

A W/O type emulsion was continuously prepared in the same manner as in Example 3 except that twenty-five circular inlet holes having an inner diameter=4r=15 μm in a width direction with a pitch of 100 μm, and two hundred inlet holes in a length direction with a pitch of 100 μm, totally five thousand inlet holes were formed by an excimer laser at the center part of the stainless steel plate 10 having a thickness of 100 μm in a 50 mm square in FIG. 5. The supply amount of the sodium silicate aqueous solution was 110 mL/h, and the linear velocity in a flow direction at the inlet holes was $3.5\times10^{-2}$ m/s. As the isononane flow path was rectangular, the pressure loss in a length L (=0.020 m) was calculated from the formula 4, whereupon it was 384 Pa.

The ratio of the linear velocity of isononane in a flow direction to the linear velocity of the sodium silicate aqueous solution at the inlet holes in a flow direction was 9.0. The state of emulsification was confirmed by means of a high speed camera, whereupon the sodium silicate aqueous solution was formed into droplets at the inlet holes, and the emulsion particles had a substantially uniform particle size of about 90 μm, however, fine emulsion particles having a particle size of about 5 μm were formed as by-products in an amount of about 5%.

The obtained W/O type emulsion was gelated in the same manner as in Example 1 to obtain silica porous spheres. It was confirmed by a scanning electron microphotograph that the silica porous spheres were substantially spherical, and the number average particle size was 76 μm, and the standard deviation was 22.6 μm. The value obtained by dividing the standard deviation of the particle size distribution by the number average particle size was 0.297, and the particle size distribution was slightly wide as compared with Examples 1 to 4, 6 and 7. Here, (number average particle size)/4r=5.07.

According to the present invention, it becomes possible to produce inorganic spheres having a substantially uniform particle size stably. Particularly, formation of large particles or small particles having particle sizes significantly outside the aimed particle size as by-products can be prevented, and inorganic spheres having a highly uniformalized particle size can be obtained.

The entire disclosures of Japanese Patent Application No. 2002-205609 filed on Jul. 15, 2002, Japanese Patent Application No. 2003-069832 filed on Mar. 14, 2003 and Japanese Patent Application No. 2003-095526 filed on Mar. 31, 2003 including specifications, claims, drawings and summaries are incorporated herein by reference in their entireties.

What is claimed is:

1. A process for producing inorganic spheres, which comprises injecting an aqueous liquid containing an inorganic compound through an inlet hole into an organic liquid which flows at a flow rate of from 0.001 to 2 m/s in a laminar flow state in a flow path to form a W/O type emulsion, wherein the Reynolds number for the organic liquid which flows in the flow path is at most 2,100 and solidifying the aqueous liquid containing an inorganic compound in the W/O type emulsion.

2. The process for producing inorganic spheres according to claim 1, wherein the aqueous liquid contains silica, and the inorganic spheres are silica porous spheres.

3. The process for producing inorganic spheres according to claim 2, wherein the W/O type emulsion is gelated by adding an acid.

4. The process for producing inorganic spheres according to claim 1, wherein the organic liquid is a $C_{9-12}$ saturated hydrocarbon.

5. The process for producing inorganic spheres according to claim 1, wherein the Reynolds number of the organic liquid is at most 500.

6. The process for producing inorganic spheres according to claim 1, wherein the ratio of the linear velocity of the organic liquid in a flow direction to the linear velocity of the aqueous liquid in a flow direction is from 1 to 500.

7. The process for producing inorganic spheres according to claim 1, wherein the cross section of the inlet hole has at least one shape selected from the group consisting of circular, rectangular, triangular and elliptic shapes.

8. The process for producing inorganic spheres according to claim 7, wherein the quadruple of the hydraulic radius r of the cross section of the inlet hole is from 0.1 to 500 μm.

9. The process for producing inorganic spheres according to claim 1, wherein the flow path is compartmentalized by a partition wall, and the inlet hole is formed so that it perforates in a thickness direction of one partition wall.

10. The process for producing inorganic spheres according to claim 9, wherein a plurality of the inlet holes are formed on one partition wall with a distance of at least half the diameter of a circle which is circumscribed around the cross-sectional shape of the inlet holes.

11. The process for producing inorganic spheres according to claim 9, wherein at least 100 inlet holes are formed, and the pressure loss of the organic liquid as between the inlet hole which is located at the most upstream side of the organic liquid and one at the most downstream side is from 10 to 1,000 Pa.

12. The process for producing inorganic spheres according to claim 11, wherein the flow path of the organic liquid is installed at an angle of at least 30° to the horizontal plane and the organic liquid flows from bottom to top.

13. The process for producing inorganic spheres according to claim 12, wherein the flow path of the organic liquid is installed vertically to the horizontal plane.

14. The process for producing inorganic spheres according to claim 11, wherein the distance between the inlet hole which is located at the most upstream side of the organic liquid and one at the most downstream side is from 1 to 300 mm.

15. The process for producing inorganic spheres according to claim 11, wherein the number average particle size is from 0.1 to 100 μm.

16. The process for producing inorganic spheres according to claim 9, wherein the quadruple of the hydraulic radius r of the cross section of the inlet hole is from 0.1 to 100 μm, the ratio of the number average particle size of the inorganic spheres to the quadruple of the hydraulic radius r of the cross section is from 0.1 to 5.0, and the ratio of the linear velocity of the organic liquid in a flow direction to the linear velocity of the aqueous liquid in a flow direction is from 10 to 300.

17. The process for producing inorganic spheres according to claim 16, wherein at least 100 inlet holes are formed on one partition wall.

18. The process for producing inorganic spheres according to claim 16, wherein the number average particle size is from 10 to 100 μm.

19. The process for producing inorganic spheres according to claim 16, wherein the value obtained by dividing the standard deviation of the particle size distribution by the number average particle size is at most 0.2.

* * * * *